US008395809B2

(12) United States Patent
Engler et al.

(10) Patent No.: US 8,395,809 B2

(45) Date of Patent: Mar. 12, 2013

(54) POSITIONING DEVICE FOR A COLOR MEASURING HEAD

(75) Inventors: Hans Engler, Schriesheim (DE); Werner Huber, Wiesloch (DE); Manfred Schneider, Bad Rappenau (DE); Volker Becker, Malschenberg (DE)

(73) Assignee: Heidelberger Druckmaschinen AG, Heidelberg (DE)

( * ) Notice: Subject to any disclaimer, the term of this patent is extended or adjusted under 35 U.S.C. 154(b) by 1148 days.

(21) Appl. No.: 11/865,320

(22) Filed: Oct. 1, 2007

(65) Prior Publication Data

US 2008/0087114 A1 Apr. 17, 2008

(30) Foreign Application Priority Data

Oct. 13, 2006 (DE) ........................ 10 2006 048 539

(51) Int. Cl.
*G01M 1/00* (2006.01)

(52) U.S. Cl. ............ 358/1.5; 358/509; 358/1.9; 356/72; 356/402

(58) Field of Classification Search ............. 250/559.29; 358/530, 474, 448, 1.5, 453, 1.9, 509; 347/37; 382/162, 112; 356/73, 416, 402, 326
See application file for complete search history.

(56) References Cited

U.S. PATENT DOCUMENTS

| | | | | |
|---|---|---|---|---|
| 5,163,012 | A | 11/1992 | Wuhrl et al. | |
| 5,222,154 | A * | 6/1993 | Graham et al. | 382/162 |
| 5,378,994 | A * | 1/1995 | Novak et al. | 324/671 |
| 5,388,195 | A * | 2/1995 | Aoyama | 358/453 |
| 5,706,083 | A | 1/1998 | Iida et al. | |
| 5,714,928 | A * | 2/1998 | Sudo et al. | 340/436 |
| 5,957,049 | A | 9/1999 | Ammeter et al. | |
| 6,086,274 | A * | 7/2000 | Krzyminski | 400/703 |
| 6,157,439 | A * | 12/2000 | Rousseau et al. | 355/61 |
| 6,765,674 | B2 * | 7/2004 | Orelli et al. | 356/402 |
| 6,789,876 | B2 * | 9/2004 | Barclay et al. | 347/37 |
| 7,177,747 | B2 * | 2/2007 | Hiwatashi | 701/70 |
| 7,671,992 | B2 * | 3/2010 | Ehbets et al. | 356/416 |
| 7,692,775 | B2 * | 4/2010 | Treado et al. | 356/73 |
| 7,884,926 | B2 * | 2/2011 | Engler et al. | 356/73 |
| 8,054,454 | B2 * | 11/2011 | Treado et al. | 356/73 |
| 2002/0054292 | A1 | 5/2002 | Orelli et al. | |
| 2003/0095301 | A1 * | 5/2003 | Berchtold et al. | 358/530 |

(Continued)

FOREIGN PATENT DOCUMENTS

| | | | |
|---|---|---|---|
| DE | 3924989 | A1 | 2/1991 |
| DE | 29506268.1 | U1 | 6/1995 |

(Continued)

OTHER PUBLICATIONS

Chinese Office Action dated Mar. 18, 2010.

*Primary Examiner* — David K Moore
*Assistant Examiner* — Ashish K Thomas
(74) *Attorney, Agent, or Firm* — Laurence A. Greenberg; Werner H. Stemer; Ralph E. Locher

(57) ABSTRACT

A device for positioning a measuring head above a print substrate includes a display device and a motor-driven positioning device for the measuring head. The motor-driven positioning device for the measuring head is controllable by a computer connected to the display device. Measurement locations are selectable on the display device and the measuring head is positioned by the positioning device depending on the selected measurement locations.

11 Claims, 2 Drawing Sheets

U.S. PATENT DOCUMENTS

| | | | | |
|---|---|---|---|---|
| 2003/0222230 | A1 * | 12/2003 | Brauner et al. | 250/559.29 |
| 2004/0027595 | A1 | 2/2004 | Senn | |
| 2004/0042022 | A1 | 3/2004 | Friedman et al. | |
| 2004/0109205 | A1 * | 6/2004 | Asano et al. | 358/448 |
| 2004/0168601 | A1 | 9/2004 | Petermann | |
| 2004/0213436 | A1 * | 10/2004 | Noffke et al. | 382/112 |
| 2005/0073732 | A1 * | 4/2005 | Benedicto et al. | 358/527 |
| 2006/0023266 | A1 * | 2/2006 | Ohara | 358/474 |
| 2008/0030717 | A1 * | 2/2008 | Engler et al. | 356/73 |

FOREIGN PATENT DOCUMENTS

| | | | |
|---|---|---|---|
| DE | 19516059 | A1 | 11/1996 |
| DE | 19749066 | A1 | 5/1999 |
| DE | 10215548 | A1 | 10/2003 |
| DE | 10353868 | A1 | 6/2004 |
| EP | 1388418 | B1 | 2/2004 |
| GB | 2107047 | A | 4/1983 |
| JP | 2002071311 | A | 3/2002 |
| WO | 0208730 | A1 | 1/2002 |

* cited by examiner

POSITIONING DEVICE FOR A COLOR MEASURING HEAD

CROSS-REFERENCE TO RELATED APPLICATION

This application claims the priority, under 35 U.S.C. §119, of German Patent Application DE 10 2006 048 539.4, filed Oct. 13, 2006; the prior application is herewith incorporated by reference in its entirety.

BACKGROUND OF THE INVENTION

Field of the Invention

The present invention relates to a device for positioning a measuring head above a print substrate, including a display device and a motor-driven measuring head positioning device controllable by a computer connected to the display device.

In order to improve the quality of print substrates that are produced in a printing press, it is necessary to extract and inspect test sheets at regular intervals. Objective inspection can only be carried out with measuring devices that measure the color of the test sheet on one hand and detect register deviations on the other hand. Color measuring devices and register measuring devices are known from the prior art. Once a test sheet has been removed from the delivery pile of a printing press, the test sheet is placed on an inspection table connected to a color measuring device, for example. The color measuring device may either inspect the entire printed image on the print substrate or may conduct colorimetric measurements of individual spots to compare the measured values to the data of an original image. If the deviations of the measured sheet relative to the original image are within an acceptable tolerance, the sheet is acceptable. If the deviations are too great, the settings of the printing press must be changed. European Patent EP 13 88 418 B1, corresponding to U.S. Patent Application Publication No. US 2004/0027595, discloses a method of quality monitoring and of production release during the production run. In that system, the image of individual copies of the production run is measured in colorimetric terms and the measured values are compared to the data of the prepress stage. In the case of deviations, the data are used to adjust the inking system of the printing press. In addition, the data of the measured printed image can be transmitted to the prepress department by a data connection, so that test image data can be evaluated in the prepress department for quality monitoring purposes. The results of the quality evaluation are then transmitted to the print shop having the printing press through a data connection. The print shop gives the go-ahead for the production run, depending on the transmitted result. In accordance with one procedure, selected measurement positions and desired color values for those measurement positions can be defined in the digital data of the original image. The defined measurement positions will then be measured on the print substrate in the print shop and be used for ink system control purposes in the printing press. Moreover, European Patent EP 13 88 418 B1, corresponding to U.S. Patent Application Publication No. US 2004/0027595, mentions that a printed sheet is divided into a plurality of evenly distributed measuring elements, which are measured spectrally. The measured spectral image data are then represented on a screen.

However, the method disclosed in European Patent EP 13 88 418 B1, corresponding to U.S. Patent Application Publication No. US 2004/0027595, does not provide the possibility of selecting individual measurement positions at a later stage, in addition to the transmission of the measurement positions from the prepress department to the measuring device. That is to say that if the press operator would like to select individual measurement positions at the measuring device itself, he or she cannot do so in the disclosed method.

SUMMARY OF THE INVENTION

It is accordingly an object of the invention to provide a positioning device for a color measuring head, which overcomes the hereinafore-mentioned disadvantages of the heretofore-known devices of this general type and which enables a user to select individual measurement locations for an existing printed sheet and includes a measuring device that then moves to the selected measurement locations.

With the foregoing and other objects in view there is provided, in accordance with the invention, a positioning device operative above a print substrate. The positioning device comprises a measuring head disposed above the print substrate, a motor-driven positioning device for the measuring head, and a computer connected to the positioning device for the measuring head, for controlling the positioning device for the measuring head. A display device is connected to the computer for selecting measurement locations on the display device to position the measuring head with the positioning device for the measuring head, depending on the selected measurement locations.

In accordance with the present invention, the measuring device is preferably a color measuring device that includes a measuring head for scanning the surface of a print substrate. The measuring head must be suitable for being positioned in any desired position above the entire surface of a print substrate. For this purpose, it is expedient to provide a motor-driven positioning device that is able to move the measuring head freely above the print substrate in the x and y directions of a Cartesian coordinate system in the plane of the print substrate. In order to be able to move the measuring head to selected measurement locations on the print substrate in a targeted way, the positioning device is equipped with an electronic control unit that is connectable to a computer. The computer is in turn connected to a display device that can display the print substrate to be measured. The display device may be a monitor or an image projection device for representing the print substrate. In accordance with the present invention, an operator can select measurement locations on the display device. The computer then registers and stores the measurement locations and transmits them to the positioning device for the measuring head. Depending on the data provided by the computer, the measuring head is moved to precisely the location on the print substrate that the operator has input at the display device. The advantage of the present invention is that the operator does not have to input measuring coordinates himself or herself and does not have to check whether or not the measurement coordinates correspond to the desired measurement location. Instead, he or she can select the measurement locations by merely pointing at them on the display device that displays a virtual image of the print substrate. The computer then calculates the coordinates of the selected locations to scale, depending on the scale of the representation on the display device, and converts them to the scale of the actual print substrate in order for the corresponding coordinates to be available to the positioning device for the measuring head. The conversion depends on the size of the display device and on the size of the represented print substrate. In this way, the operator of a measuring device can select the desired measurement locations merely by pointing at them on the virtual image of the print substrate. This is particularly useful as far as color measurement devices are concerned that require selection of individual spots to be scanned by a color measuring head.

In accordance with another feature of the invention, the computer is able to receive digitized data of the image to be printed on the print substrate from a computer of the pre-press department. In this embodiment, the digitized data of the original image, which are required in the pre-press department to produce a printing form for an offset printing press, are directly transmitted to the computer of the measuring device through a data connection. The data that have been transmitted in this way may then be represented on the display device in order for the operator to be able to select the measurement locations on the virtual print substrate as it is displayed coming from the pre-press department. The transmission of the digitized data from the pre-press department may take place automatically when a new print job is selected. This is to ensure that the operator can see the current print substrate on the display that will actually be produced in the printing press and will be measured.

In accordance with a further feature of the invention, the measurement locations are selectable on the display device through the use of an input device, which may be a computer mouse that the operator can use to point at and select the desired measurement locations on the screen. In addition or alternatively, the display device may be a touch screen on which the operator can select measurement locations on the virtual print substrate by touching the desired locations. The selected measurement locations are then stored in the computer and are used to control the positioning device. The computer may be programmed to initially register a sequence of selected measurement locations, to store them in memory, and then, once the operator has input a completion signal, to cause the positioning device and measuring head to sequentially scan the stored measurement locations. If the measuring head is a color measuring head, the registered color measurement values may be retransmitted to the computer and displayed on the display device. Another possibility is to display only deviations between the original image and the registered values. If the deviations are not within acceptable tolerances, they may be highlighted by a red mark, for example, so that the operator may notice them immediately.

In accordance with an added feature of the invention, a particularly advantageous aspect is that the measuring head registers the position of the print substrate and factors it in when determining the position into which the measuring head is to be moved to scan the measurement locations. In this case, the measuring head may detect the position of the print substrate relative to the measuring device and may correct print substrates that are skewed, for example, in a suitable way in the computer. For this purpose, the edges of the print substrate or the outer side of the printed image located on the print substrate may be detected. Another possibility is to detect position marks, color control strips, or register marks, which have a typical structure, on the print substrate, to determine the position of the print substrate. This correction device ensures that the measuring head is moved to the correct measuring positions on the print substrate even when the print substrate is skewed relative to the measuring device.

In accordance with an additional feature of the invention, the measuring head includes a preview sensor with a high geometric resolution of at least 50 dpi. Such an optical resolution is sufficient to register the environment of a measurement location with high precision in order to be able to zoom in on the desired measurement location, for example for color measuring purposes. The geometric resolution of the image of the original, as it is provided from the pre-press department, ought to be at least 25 dpi in order to be able to select measurement locations on a screen with sufficient precision.

In accordance with yet another feature of the invention, the measuring head has a color sensor for spectral measurement. A spectral measurement color sensor provides accurate color measurements of the selected measurement locations. In addition, the measuring head may include a light pointer for marking the targeted spots on the print substrate by a dot of light. Thus, the operator has the opportunity to visually check, on the print substrate, whether or not the measured position corresponds with sufficient probability to the measurement position he or she selected. In the process, a blinking light or other optical or acoustic signals may indicate that the measuring head has reached the measurement location once the measuring head has been positioned. Before the measurement is carried out, the operator may be given the opportunity to confirm or correct, if necessary, the displayed position on the display device.

In accordance with a concomitant, particularly advantageous feature of the invention, the measuring head scans the environment of a measurement location as the measuring head is moved to a selected measurement location by the positioning device, and the results of the scanning operation are compared to digitized image data of the printed image on the print substrate in the computer. In this case, the measuring head includes a scanning device that optically registers a sufficiently large area around a spot to be measured. This may be done by a preview sensor that has a good geometric resolution but does not need a particularly high color resolution like the color sensor. The preview sensor is responsible for the positioning and for detecting the measurement position on the print substrate lying on the measurement table and can thus fine-control the positioning of the color measuring head above the measurement location to be measured. Moreover, the area registered by the color measuring head may be noticeably smaller than the area registered by the preview sensor. The use of a preview sensor with high geometric resolution may improve the accuracy of positioning of the color sensor of the measuring head.

Other features which are considered as characteristic for the invention are set forth in the appended claims.

Although the invention is illustrated and described herein as embodied in a positioning device for a color measuring head, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DETAILED DESCRIPTION OF THE INVENTION

Figure 1:
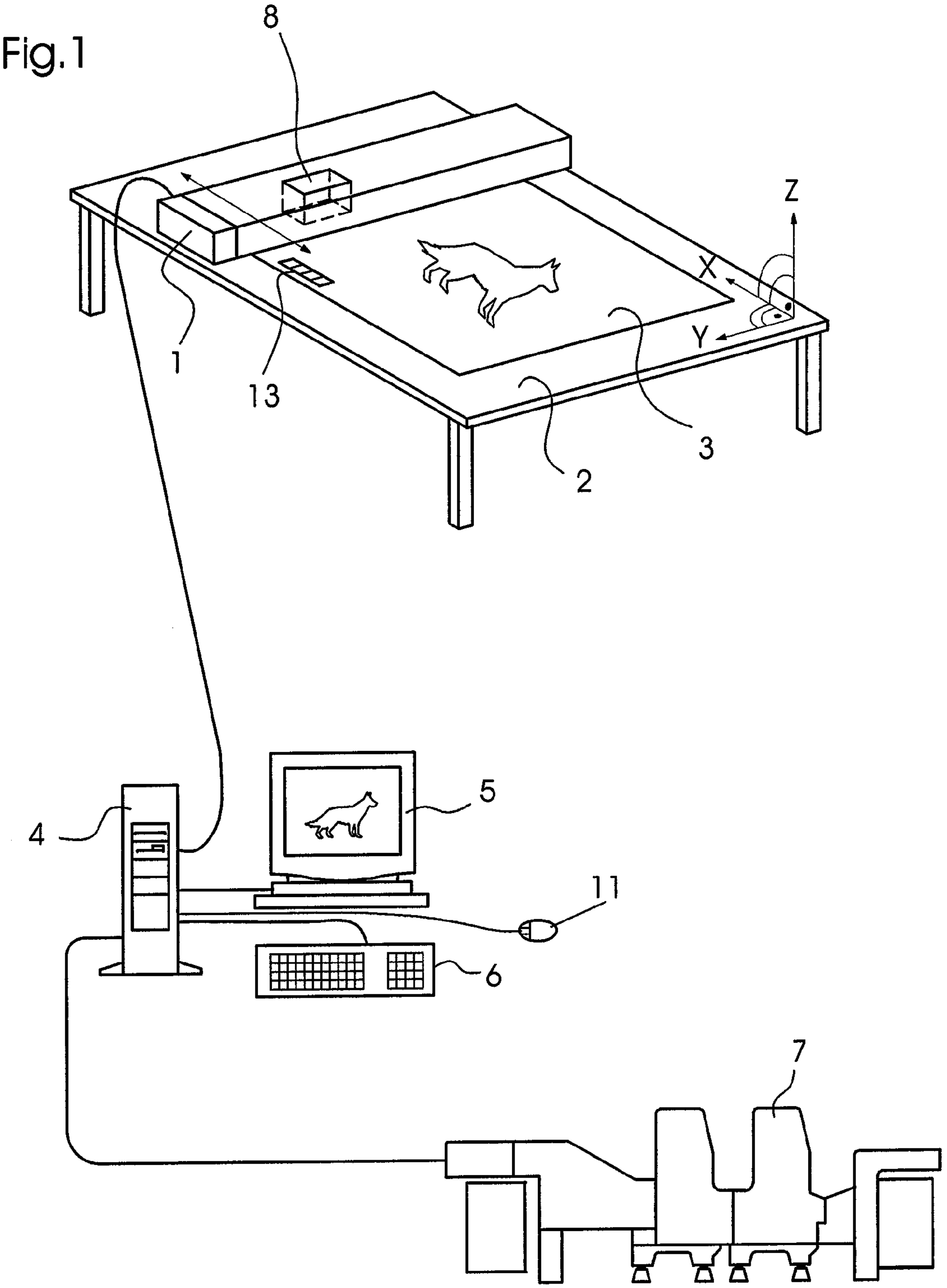
FIG. 1 is a diagrammatic, partly perspective and partly elevational view of a motor-driven color measurement device provided on a measurement table and connected to a computer.

Referring now to the figures of the drawings in detail and first, particularly, to FIG. 1 thereof, there is seen a color measurement device connected to a computer 4. The color measurement device is formed of a measurement table 2, on which print substrates 3 that have been produced may be placed. A measuring bar 1, in the from of a motor-driven positioning device, is provided for carrying out color measurements, for example, on the print substrates 3 placed on the measurement table 2. The measuring bar 1 shown in FIG. 1 is movable in the X direction in order to move across the entire length of a print substrate 3 resting on the table. The measuring bar 1 includes a measuring head 8, which is movable in the Y direction and can be moved to specific measurement locations on the print substrate 3 to carry out color measurements on the measurement locations. In addition, the measuring head 8 may be used, for example, to register, identify, and measure color control strips 13 on the print substrate 3. The data measured by the measuring head 8 are transmitted to the computer 4 and may be displayed on a display device such as a screen 5 connected to the computer 4. The computer 4 and the screen 5 are controllable by an operator through an input device such as a keyboard 6 and a mouse 11. The computer 4 may be a standard desktop or laptop PC equipped with appropriate control software for operating the color measuring device. A communication connection connects the computer 4 to a printing press 7 so that adjustment and control operations can be carried out on an inking unit of the printing press 7. For this purpose, the computer 4 has access to the digital data of the original image of the print substrate 3 that is currently being produced. In the computer 4, the data obtained by the measuring head 8 are compared to the corresponding data of the original image to recognize deviations. If the deviations exceed an acceptable tolerance, adjustments can be carried out in the inking units of the printing press 7 to reach the desired value.

The color measurement device in question preferably measures individual spots on the print substrate 3. These measurement locations may either be present in the original image stored in the computer 4, if they have been introduced as measurement locations in the file of the original image by a pre-press department. However, in many instances, the press operator wants to define his or her own individual measurement locations for a calorimetric inspection of the printed sheet 3. In the embodiment shown in FIG. 1, he or she can do so prior to the measurement operation by using the mouse 11 and the keyboard 6 to select individual measurement locations on the screen 5. For this purpose, the original image is displayed on the screen 5 in a way that is as detailed and as accurate as possible. The resolution of the displayed original image is limited by the resolution of the screen 5. Since even high-resolution screens 5 usually do not exceed a display capacity of more than 2 million pixels, the computer 4 gives the operator the option of enlarging specific areas on the screen 5. This magnifying function allows the operator to define and mark a certain area on the complete image of the original displayed on the screen 5 with the mouse, for example. The selected area is then displayed in an enlarged form on the screen 5 as desired. In order to be able to make an accurate selection of measurement locations on the screen 5, the selected section ought to be displayed in a resolution of at least 25 dpi. The operator can then use the mouse 11 to indicate the desired measurement locations on the screen 5. The selected measurement locations are then stored in the computer 4. It is thus possible to select any desired number of measurement locations by switching between full image and enlarged section. Once the operator has selected all desired measurement locations, the latter are forwarded to the measuring device. Then the measuring head 8 is sequentially moved to the selected measurement locations on the print substrate 3. For this purpose, the computer 4 may calculate the most favorable path of movement including all measurement locations, so that the inspection of the selected measurement locations on the print substrate 3 can be carried out as quickly as possible.

In order for the measurement locations selected on the screen 5 to correspond to the measurement locations 3 that are actually inspected on the print substrate 3, the coordinates of the measured print substrate 3 must be correlated with the image data displayed on the screen 5. This is important, in particular, for a case in which the print substrate 3 has been placed on the measurement table 2 in a skewed orientation. For this purpose, the measuring head 8 may initially measure one corner of the print substrate 3 and then further marks on the print substrate 3, such as color control strips 13. With the aid of these marks, the computer 4 may then determine the actual position of the printed image on the print substrate 3. Based on this actual position, the coordinates of the measurement locations selected by the operator are adjusted in an appropriate way so that the measuring head is moved to the desired measurement locations even if the print substrate 3 is skewed. The original image may be stored in the computer 4, or the computer 4 may directly access the computer of the pre-press department through an internal network or the web to display the original image data online on the screen 5.

Figure 2:
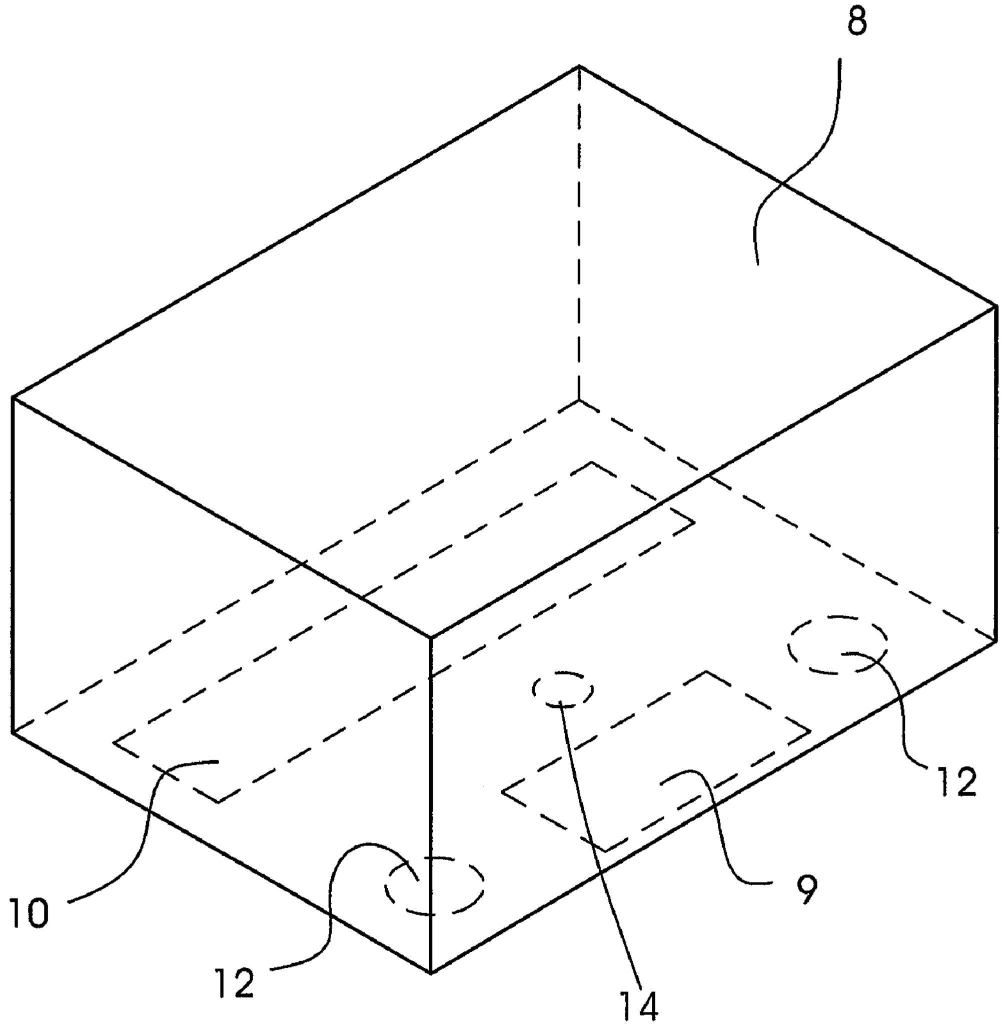
FIG. 2 is a perspective view showing a detailed representation of a measuring head in the motor-driven positioning device of the color measurement device.

The measuring head 8 of the measuring device shown in FIG. 1 is illustrated in more detail in FIG. 2. As can be seen, the measuring head 8 is equipped with a color sensor 10 for the spectral measurement of individual measurement locations on the print substrate 3. In addition, the measuring head 8 includes a preview sensor 9, which also scans the print substrate 3 optically. The preview sensor 9 is provided upstream of the color sensor 10, as viewed in the scanning direction of the measuring bar 1, so that the preview sensor 9 is the first to scan the surface of the print substrate 3, followed by the color sensor 10. It is the task of the preview sensor 9 to scan the surface of the print substrate 3 at a high geometric resolution of at least 50 dpi in order to target precisely the measurement location that the operator selected on the screen 5. Once the desired position has been reached, the color sensor 10 is positioned with the aid of the data registered by the preview sensor 9 in such a way that a calorimetric measurement can be taken at precisely the selected measurement location. A great advantage of this feature is that the color sensor 10 does not need a high geometric resolution. Moreover, the area scanned by the color sensor 10 may be considerably smaller than the area scanned by the preview sensor 9, because it is not the task of the color sensor 10 to position the measuring head 8. As a consequence, the color sensor 10 does not have to scan the environment of the measurement location. The preview sensor 9, which has a high geometric resolution, is perfectly suited to detect borders and color strips 13 on the print substrate 3 and thus to use the position of the color strip 13 as an indicator of the position of the print substrate 3 on the measurement table 2. Likewise, the preview sensor 9 can register the structure of the color control strip 13 and assign the color control strip 13 to a specific type of color control strips.

Furthermore, the measuring head 8 has two lighting devices 12, which illuminate the area that is registered by the measuring head 8 on the print substrate 3 for the purpose of a better detection of image dots. The lighting devices 12 may be constructed in such a way that one is associated with the preview sensor 9 and the other is associated with the color sensor 10. In addition, the measuring head 8 is provided with a light pointer 14. The light pointer 14 is formed of a bright, dot-shaped light source that optically marks the measurement location that has been reached on the print substrate 3. Thus, the measurement location is brightly lit on the print substrate 3 for the operator, so that the operator can see which measurement location is currently being targeted on the print substrate. This gives the operator the opportunity to optically control the targeted measurement location and to compare the latter with the one selected on the screen 5. The user interface on the screen 5 may be constructed in such a way that once the measuring position has been reached on the print substrate 3, the operator is asked whether or not he or she accepts the measurement location marked on the print substrate 3 by the light pointer 14. If the operator accepts the measurement location, the latter will be measured and the measuring continues. If the operator does not accept the indicated measurement location, he or she may be given a chance to correct the displayed measuring position. Thus, at all times the operator is able to compare the measurement location selected on the screen 5 to the measurement location actually targeted on the print substrate 3 and can thus visually monitor the measuring operation with his or her own eyes.

The measuring bar 1 and the measuring head 8 shown in FIG. 1 are provided with electric drives for moving the measuring bar 1 in the X direction as desired and for moving the measuring head 8 in the Y direction as desired. These drives may be linear drives. The computer 4 can automatically move the measuring devices to the measurement locations selected by the operator by controlling the drives for the measuring bar 1 and the measuring head 8. The screen 5 may also be a touch screen so that the operator can select the measurement locations on the screen 5 simply by touching the surface of the screen. This input method is especially intuitive, because the operator only has to point at the desired measurement locations on the screen 5. In addition or as an alternative to the screen 5, a large-format projection by a video projector is possible. In this case, individual measurement locations may be selected with the aid of a mouse 11, having a pointer which is also projected. It is likewise possible to register the gestures of the operator with a camera, so that in this case too, the operator only needs to point at the measurement locations.

The invention claimed is:

1. A positioning device operative above a print substrate, the positioning device comprising:

a measuring head disposed above the print substrate on a measurement table;

a motor-driven positioning device for said measuring head being movable in an X and Y direction of a Cartesian coordinate system in a plane of the print substrate;

a computer connected to said positioning device for said measuring head, for controlling said positioning device for said measuring head; and a display device connected to said computer for selecting measurement locations on said display device to position said measuring head with said positioning device for said measuring head, depending on said selected measurement locations; and said measuring head including a color sensor for spectral measurement, said measuring head including a preview sensor with a high geometric resolution of at least 50 dpi for targeting the measuring locations for said color sensor.

2. The device according to claim 1, wherein said computer receives digitized data of a print image on the print substrate to be transmitted from a computer of a pre-press department.

3. The device according to claim 2, wherein the digitized print image on the print substrate can be displayed on said display device.

4. The device according to claim 1, which further comprises an input device for selecting said measurement locations on said display device.

5. The device according to claim 1, wherein said display device is a touch screen.

6. The device according to claim 1, wherein said measuring head detects a position of the print substrate and factors in said position when determining movement to a position of said measurement locations.

7. The device according to claim 1, wherein said measuring head includes a light pointer.

8. The device according to claim 1, wherein said measuring head includes a preview sensor with a high geometric resolution of at least 50 dpi, a color sensor for spectral measurement, and a light pointer.

9. The device according to claim 1, wherein said display device displays a query of acceptance upon a movement to a selected measurement location.

10. The device according to claim 1, wherein said measuring head, when moved to a selected measurement location by said positioning device for said measuring head, scans an environment of said measurement location, for comparing results of a scanning operation to digitized image data of a print image on the print substrate in said computer.

11. The device according to claim 1, wherein said measuring head includes a preview sensor with a high geometric resolution of at least 50 dpi for scanning an area, and a color sensor for spectral measurement for scanning an area, said area scanned by said preview sensor being larger than said area scanned by said color sensor.

* * * * *